Jan. 30, 1951  B. WELTE  2,539,981
BROACHING MACHINE
Filed June 11, 1947  2 Sheets-Sheet 1
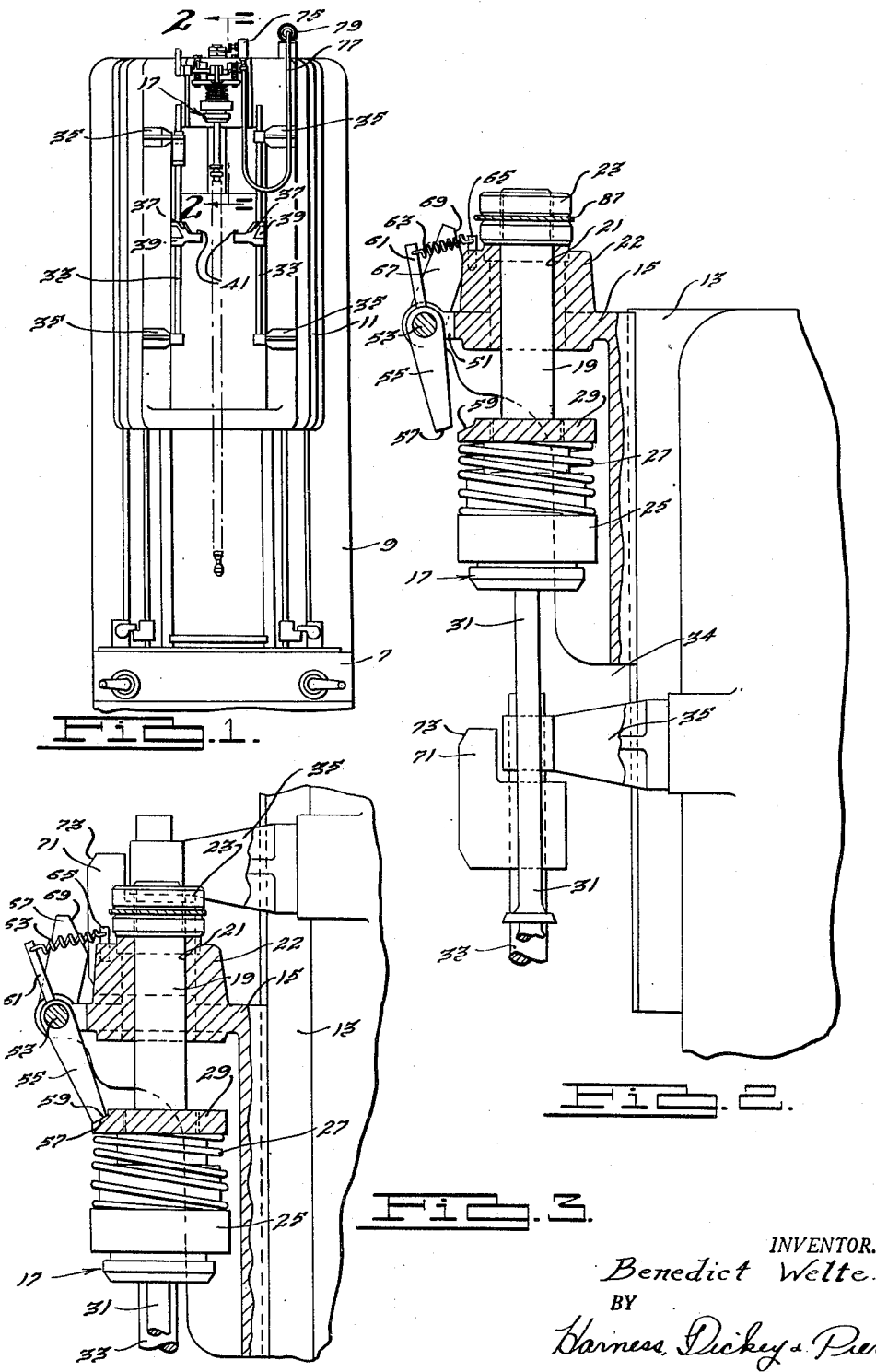
INVENTOR.
Benedict Welte.
BY
Harness, Dickey & Pierce.
ATTORNEYS.

Jan. 30, 1951 B. WELTE 2,539,981
BROACHING MACHINE
Filed June 11, 1947 2 Sheets-Sheet 2

INVENTOR.
Benedict Welte.
BY
Harness, Dickey & Pierce
ATTORNEYS.

Patented Jan. 30, 1951

2,539,981

UNITED STATES PATENT OFFICE 2,539,981

BROACHING MACHINE

Benedict Welte, Lake Orion Township, Oakland County, Mich., assignor to Colonial Broach Company, Warren Township, Mich., a corporation of Delaware Application June 11, 1947, Serial No. 753,843

8 Claims. (Cl. 90—33)

The present invention relates to pull-broaching machines of the type employing long, relatively small-diameter broaches and more particularly to such broaching machines constructed so as to prevent breakage of the broaches when the latter are carried by the broach-handling chuck prior to being received in the broach-pulling chuck.

Conventional broaching machines are generally provided with a broach-handling chuck which is adapted to engage the trailing end of a broach and advance the forward end through a workpiece opening and into a broach-pulling chuck, whereupon the broach-handling chuck is released from the opposite end of the broach and the broach is pulled through the workpiece opening by the broach-pulling chuck to perform the desired operation. When an extremely long and relatively small-diameter broach is carried in the broach-handling chuck, the broach is often broken due to the fact that the forward end of the broach often abuts the workpiece instead of passing through the work-piece open to be broached. This misalignment and breakage may result from various factors, such as faulty location of the workpiece, a defective opening in the workpiece or misalignment of the unguided forward end of the broach.

Accordingly, it is the object of this invention to provide in a broaching machine means to prevent breakage of broaches under the circumstances mentioned.

Other objects of this invention will become more apparent from the following detailed description taken in conjunction with the accompanying drawings in which:

Figure 1 is a fragmentary front elevational view of the broaching machine of this invention;

Fig. 2 is an enlarged fragmentary view partially in section and partially in elevation taken along the line 2—2 of Fig. 1;

Fig. 3 is a view similar to Fig. 2 showing the broach-handling mechanism in a locked position;

Figure 4:
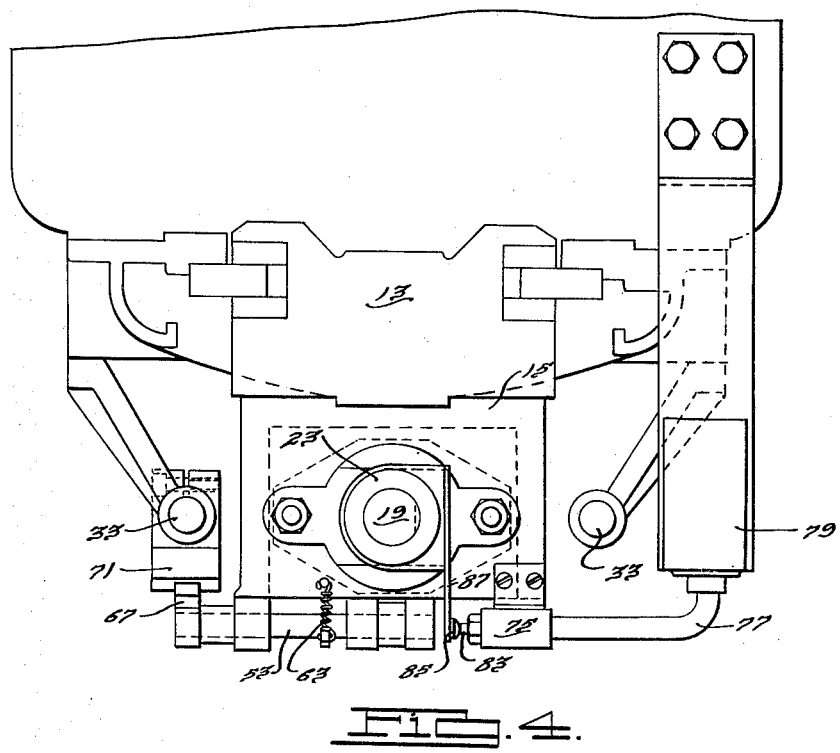
Fig. 4 is an enlarged fragmentary top plan view of the structure illustrated in Fig. 1.

The particular machine illustrated is a pull-down broaching machine and includes a work-supporting table 7 and a vertically extending frame 9. A generally rectangular auxiliary framework 11 is carried on the front face of the frame 9 and includes ways upon which is mounted a slide 13 which carries a bracket 15. The bracket 15 which may be of any desired form is connected to a broach-handling chuck 17 through a lost motion connection. This connection is formed by means of a rod 19 which is slidably received in an aperture 21 provided in a boss 22 formed on the upper horizontal wall of the bracket 15. The extreme upper end of the rod 19 has a pair of lock nuts 23 threaded thereon which prevent the upper end of the rod 19 from passing through the bracket aperture 21. The lower end of the rod is fixedly connected to the chuck 17 as described below.

The interior construction of the broach-handling chuck 17 is generally of the type illustrated in the applicant's Patent No. 2,338,989, issued January 11, 1944. A cylindrical sleeve 25 surrounds the chuck body and is held in a down position by a spring 27 abutting the upper end thereof and the underside of a ring 29 fixed to the rod 19 above the sleeve 25, so as to secure the upper end of an extremely long, relatively small diameter broach 31 within the chuck 17. The chuck therefore is of the automatic releasing type, as illustrated in the aforementioned patent, and the chuck releases the broach when the sleeve 25 strikes a stationary abutment, as described below.

As best shown in Fig. 1, the chuck releasing mechanism comprises a pair of parallel, oppositely disposed rods 33 fixed, by means of vertically spaced brackets 35, to the front face of the frame 11 and extending parallel to the direction of travel of the broach-handling chuck. A bracket 37 having a boss 39 formed with an internal opening in the side to receive one of the rods 33 is slidable upon each of the rods. The extremity of each bracket 37 is provided at its end with a hardened button 41, the upper surface of which is adapted to act as an abutment engaged by the sleeve 25 of the chuck 17 to cause the release of the broach 31. These brackets 37 are adapted to be swung outwardly or inwardly to engage any size chuck, substantially as illustrated in the aforementioned patent of the applicant.

Figures 5, 6:
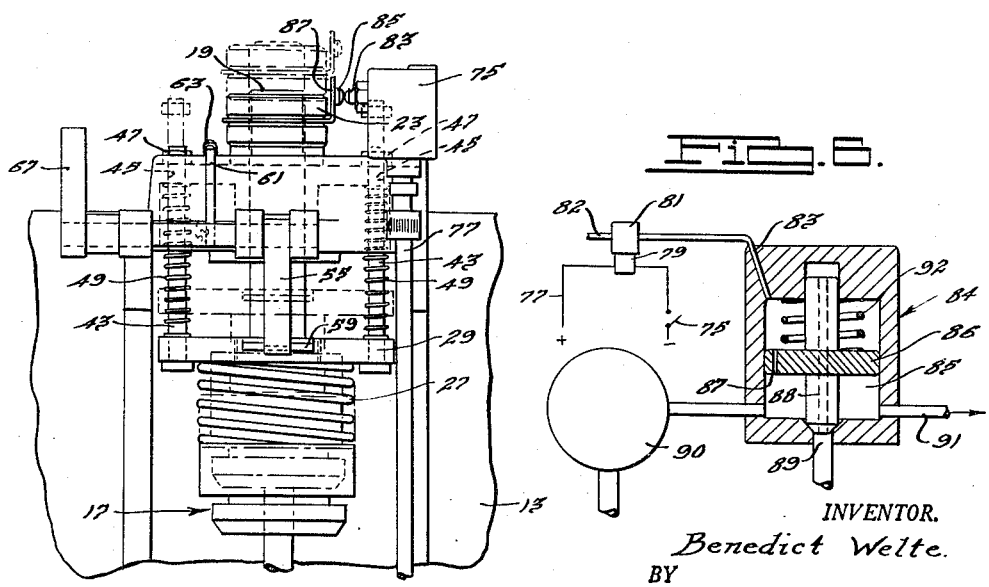
Fig. 5 is an enlarged, fragmentary, front elevational view of the structure of Fig. 1.
Fig. 6 is a schematic diagram of a portion of the hydraulic system for the broaching machine.

As can be seen in Fig. 5, a pair of oppositely disposed vertical pins 43 are fixed to the ring 29 and extend upwardly through apertures 45 in the upper wall of the bracket 15. The upper end of each of the pins 43 receives a nut 47 adapted to abut against the top surface of the bracket. Surrounding each of the pins 43 and disposed between the upper surface of the ring 29 and the horizontal upper wall of the bracket 15 is a coil spring 49 adapted to urge the broach-handling chuck 17 downwardly with respect to the bracket 15. The lock nut 23 on the upper end of the rod 19 will then abut the upper surface of the bracket 15 so that the broach handling chuck will, at least initially, move downwardly with the bracket. However, with a pull-down broaching machine of the type illustrated herein, where the broach-handling chuck carries the broach downwardly, the force of gravity would ordinarily hold the upper end of the rod 19 and the lock nuts 23 downwardly on the upper surface of the bracket without the aid of the springs 49. The springs 49 are provided merely to aid the force of gravity in a pull-down machine and are not essential, but would be necessary for a pull-up machine, wherein the direction of movement of the broach would be upward.

Mounted on the front face of the reciprocating bracket 15 by means of ears 51 is a pin 53. Pivotally supported on the pin 53 is a depending arm 55, the lower end of which is inclined as at 57 and adapted to engage a complemental notch 59 in the top face of the ring 29.

Rigidly secured to the pin 53 and axially spaced from the depending arm 55 is an upstanding arm 61, the upper end of which has one end of a spring 63 connected thereto. The opposite end of the spring 63 is connected to a pin 65 secured in the bracket boss 22. This spring normally causes the shaft 53 to be rotated clockwise to swing the lower end of the depending arm 55 out of engagement with the notch 59 in the ring 29.

As best seen in Figs. 3 and 5, the extreme left-hand end of the shaft 53 has a second upstanding arm 67 fixed thereto which is formed with an inclined cam face 69 on the upper end thereof. A cam element 71 is adjustably secured to the rod 33 and has its upper end beveled at 73 so that when the bracket 15 is moved downwardly the arm 67 will engage the cam lobe 73 and be rotated counterclockwise. The rotation of the arm 67 in turn causes rotation of the shaft 53 and the depending arm 55 so that the lower end 57 thereof will be swung into engagement with the notch 59 in the ring 29 and thus connect the broach-handling chuck 17 to the bracket 15 so that the chuck cannot move in a direction opposite to the direction of movement of the bracket.

The cam lobe 73, however, is so positioned that it will not engage the arm 67 until the lower end of the broach 31 has been received in the aperture in a workpiece mounted on the supporting table 7. As a result, until the lower end of the broach has passed through this workpiece aperture, the lost-motion connection between the broach-handling chuck and the bracket 15 will be maintained. However, once the end of the broach has been received in the aperture, the arm 55 will engage the ring 29 so as to permit the broach-handling chuck 17 to force the lower end of the broach down into the broach-pulling chuck which is disposed below the worktable 7. The broach-pulling chuck, while not shown, is of the same construction as the broach-handling chuck 17.

Therefore, when the bracket 15 is moved downwardly by the usual hydraulic system of the broaching machine, the broach 31 and broach-handling chuck will likewise move down, but if the lower end of the broach should abut against the upper face of the workpiece instead of passing through the aperture therein, the rod 19 and broach-handling chuck will move upwardly with respect to the bracket 15 due to the lost-motion connection, so that no shock or hard blow will be sustained by the broach which might cause the same to become broken. This upward motion will either be against the downward action of the spring 49 or against the force of gravity, if the spring is not being used.

As can be seen in Figs. 4 and 5, a normally closed switch 75 is mounted on the upper surface of the bracket 15 and is connected through a flexible cable 77 to a solenoid 79 which actuates a valve 81. Projecting inwardly from the side of the switch housing is a push button 83 which is normally contacted and held depressed by a button 85 mounted on a bracket 87 which is secured to the rod 19 between the lock nuts 23. As long as button 83 is depressed switch 75 is open. The switch 75 moves with the bracket 15 and with the broach-handling chuck 17 in the direction of movement of the broach. If the lower end of the broach abuts the top of the workpiece, instead of passing through the aperture therein the broach-handling chuck 17 and rod 19 will move upwardly with respect to the bracket 15 and the button 85 will move away from the switch button 83, as shown in dotted lines in Fig. 5, and thus permit the switch 75 to close.

Switch 75 is so connected to the hydraulic control circuit of the machine that on closure thereof the supply of hydraulic liquid to the cylinder which reciprocates slide 13, is interrupted, thus preventing the application of a heavy end thrust on the broach when the lost motion between chuck 17 and bracket 15 is taken up. The nature of this connection depends upon the type of hydraulic control mechanism employed in the broaching machine and will be obvious in any particular case to those skilled in the art. For example, if the machine is equipped with the type of control circuit disclosed in applicant's Patent No. 2,395,702, switch 75 may be effective when closed to by-pass to the tank all liquid discharged by the pump in the manner illustrated diagrammatically in Fig. 6.

Thus as shown in Fig. 6, switch 75 is located in the electrical circuit 77 of the solenoid of a normally closed solenoid opened valve 81 which is connected in a line 82 leading from the tank or low pressure region to a port 83 of a control valve 84. Valve 84, which corresponds to valve 224 of said Patent 2,395,702, has a chamber 85 in which is fitted a piston 86 having a bleed opening 87 of smaller size than line 82 and port 83 and also having a valve plunger 88 adapted to control a port 89 which is connected by suitable piping to the tank or other low pressure area. The machine is operated by a positive displacement pump 90, the output of which is connected to the valve chamber 85 below the piston. The valve chamber below the piston is also connected by a pipe 91 and suitable control valves, not shown, to the cylinders which operate the broach handling and pulling chucks. A light spring 92 normally urges the piston 86 in a direction to maintain the valve plunger 88 against its seat at port 89. So long as valve 81 is closed liquid under pressure will be supplied by the pump through line 91 to operate the cylinders of the machine, but as soon as valve 81 opens the pressure in chamber 85 above piston 86 will drop to practically zero and valve 88 will immediately open fully under the influence of the pressure acting on the lower side of the piston 86. Since spring 92 is very light all of the fluid discharged by the pump will be by-passed to the tank through part 89 at a very low pressure. This relieves the broach-handling bracket of the force due to the hydraulic pressure.

What is claimed is:

1. In a shuttle-type pull broaching machine, a reciprocating broach-handling slide, a broach-handling chuck, and means including an element rigidly connected to said chuck and slidably connected to said slide providing a lost-motion connection between said chuck and said slide in the direction of movement of the broach in order to permit said chuck to remain stationary while said slide advances if the broach strikes an obstruction.

2. In a shuttle-type pull broaching machine, a reciprocating broach-handling slide, a broach-handling chuck, means providing a lost-motion connection between said chuck and said slide in the direction of movement of the broach in order to permit said chuck to remain stationary while said slide advances if the broach strikes an obstruction, and resilient means for taking up said lost motion in one direction and causing said broach-handling chuck to move with said slide in the direction of movement of the broach.

3. In a shuttle-type pull broaching machine, a reciprocating broach-handling slide, a broach-handling chuck, means providing a lost-motion connection between said chuck and said slide in the direction of movement of the broach in order to permit said chuck to remain stationary while said slide advances if the broach strikes an obstruction, and means for preventing the lost motion between the chuck and the slide after the advancing end of the broach has passed through the workpiece.

4. In a shuttle-type pull broaching machine, a reciprocating broach-handling slide, a broach-handling chuck, means providing a lost-motion connection between said chuck and said slide in the direction of movement of the broach in order to permit said chuck to remain stationary while said slide advances if the broach strikes an obstruction, said chuck having a broach-locking mechanism adapted to release the broach when a portion thereof strikes a stationary abutment, and means for preventing the lost-motion connection between the chuck and the slide after the advancing end of the broach has passed through the workpiece in order to enable the slide to force the broach-locking mechanism against the release abutment.

5. In a shuttle-type pull broaching machine, a reciprocating broach-handling slide, a broach-handling chuck, means providing a lost-motion connection between said chuck and said slide in the direction of movement of said broach in order to permit said chuck to remain stationary while said slide advances if the broach strikes an obstruction, control means adapted to be actuated by relative movement between the slide and chuck, and means controlled by actuation of said control means to interrupt the movement of said slide.

6. In a shuttle-type pull broaching machine, a reciprocating broach-handling slide, a broach-handling chuck, a broach-locking mechanism in said chuck adapted to release the broach when a portion thereof strikes a stationary abutment, rod means fixedly connected to said chuck and axially slidable in said slide to provide a lost-motion connection between said slide and said chuck in the direction of movement of the broach in order to permit said chuck to remain stationary while said slide advances if the broach strikes an obstruction, means movably mounted on said slide and adapted in one position to engage said chuck for preventing the lost motion between the chuck and the slide after the advancing end of the broach has passed through the workpiece in order to enable the slide to force the broach-locking mechanism against the release abutment, spring means normally holding said means out of engagement with said chuck, and stationary cam means adapted to be abutted by said movable means to force the same into engagement with said chuck to prevent relative movement between said chuck and said slide.

7. In a shuttle-type pull broaching machine, a reciprocating broach-handling slide, a broach-handling chuck, a broach-locking mechanism in said chuck adapted to release the broach when a portion thereof strikes a stationary abutment, rod means fixedly connected to said chuck and axially slidable in said slide to provide a lost-motion connection between said slide and said chuck in the direction of movement of the broach in order to permit said chuck to remain stationary while said slide advances if the broach strikes an obstruction, means movably mounted on said slide and adapted in one position to engage said chuck for preventing the lost motion between the chuck and the slide after the advancing end of the broach has passed through the workpiece in order to enable the slide to force the broach-locking mechanism against the release abutment, spring means normally holding said means out of engagement with said chuck, stationary cam means adapted to be abutted by said movable means to force the same into engagement with said chuck to prevent relative movement between said chuck and said slide, control means adapted to be actuated by relative movement between the slide and chuck, and means controlled by actuation of said control means to interrupt the movement of said slide.

8. In a shuttle-type pull broaching machine, a reciprocating broach-handling slide, a broach-handling chuck, a broach-locking mechanism in said chuck adapted to release the broach when a portion thereof strikes a stationary abutment, rod means fixedly connected to said chuck and axially slidable in said slide to provide a lost-motion connection between said slide and said chuck in the direction of movement of the broach in order to permit said chuck to remain stationary while said slide advances if the broach strikes an obstruction, resilient means for taking up said lost motion in one direction and causing said broach-handling chuck to move with said slide in the direction of movement of the broach, means movably mounted on said slide and adapted in one position to engage said chuck for preventing the lost motion between the chuck and the slide after the advancing end of the broach has passed through the workpiece in order to enable the slide to force the broach-locking mechanism against the release abutment, spring means normally holding said means out of engagement with said chuck, stationary cam means adapted to be abutted by said movable means to force the same into engagement with said chuck to prevent relative movement between said chuck and said slide, control means adapted to be actuated by relative movement between the slide and chuck, and means controlled by actuation of said control means to interrupt the movement of said slide.

BENEDICT WELTE.

REFERENCES CITED

The following references are of record in the file of this patent:

UNITED STATES PATENTS

| Number | Name | Date |
|---|---|---|
| 1,937,121 | La Pointe | Nov. 28, 1933 |
| 2,338,989 | Welte | Jan. 11, 1944 |
| 2,416,055 | Johndrew | Feb. 18, 1947 |